United States Patent [19]

Sakai et al.

[11] Patent Number: 5,293,309
[45] Date of Patent: Mar. 8, 1994

[54] ESTIMATE GENERATING SYSTEM FOR AUTOMOTIVE PANEL REPAIRING

[75] Inventors: Nobuhiro Sakai, Yokosuka; Michio Sugiyama, Kamakura, both of Japan

[73] Assignee: Nissan Motor Co., Ltd., Yokohama, Japan

[21] Appl. No.: 102,417

[22] Filed: Sep. 29, 1987

[30] Foreign Application Priority Data

Sep. 30, 1986 [JP] Japan .................................. 61-232759

[51] Int. Cl.$^5$ .................................................. G06F 15/21
[52] U.S. Cl. ...................................... 364/401; 364/406; 364/709.04; 364/710.04
[58] Field of Search ............... 364/401, 406, 709, 710, 364/709.04, 710.04

[56] References Cited

U.S. PATENT DOCUMENTS

| | | | |
|---|---|---|---|
| 3,976,975 | 8/1976 | Cochran | 364/900 |
| 4,101,962 | 7/1978 | Hakata | 364/710 X |
| 4,156,912 | 5/1979 | Shigeta et al. | 364/709 X |
| 4,184,202 | 1/1980 | McCrae | 364/710 X |
| 4,435,769 | 3/1984 | Nagano et al. | 364/406 X |
| 4,507,872 | 4/1985 | Schermann | 33/549 |
| 4,771,237 | 9/1988 | Daley | 324/202 |

FOREIGN PATENT DOCUMENTS

| | | |
|---|---|---|
| 0132660 | 10/1981 | Japan . |
| 0132661 | 10/1981 | Japan . |
| 0132662 | 10/1981 | Japan . |

OTHER PUBLICATIONS

Haggerty, A. G. "Computer is speeding up auto repair estimates", *National Underwriter* (*Property/Casualty*), vol. 87, No. 43, Oct. 28, 1983, 46.

O'Neil, E. F. "Voice entry: Terminals you can talk to", *Data Communications*, vol. 11, No. 10, Oct. 1982, 133–4, 137–8, 141.

*Primary Examiner*—Jerry Smith
*Attorney, Agent, or Firm*—Foley & Lardner

[57] ABSTRACT

A cost estimate generating system comprises a pocket type computer which includes a control schedule which sequentially requests data relating to the number of damaged panels, the number of damaged sections of each of the panels, the damage degree or repair difficulty degree, the presence or absence of scratches, the length and depth of any scratches, the type of paint work (e.g. metallic or solid finish, the number of different colors or tones) and the current labor rate (cost per man hour); and calculates the amount of work, the amount of paint required and the cost of the paint based on the data input.

6 Claims, 4 Drawing Sheets

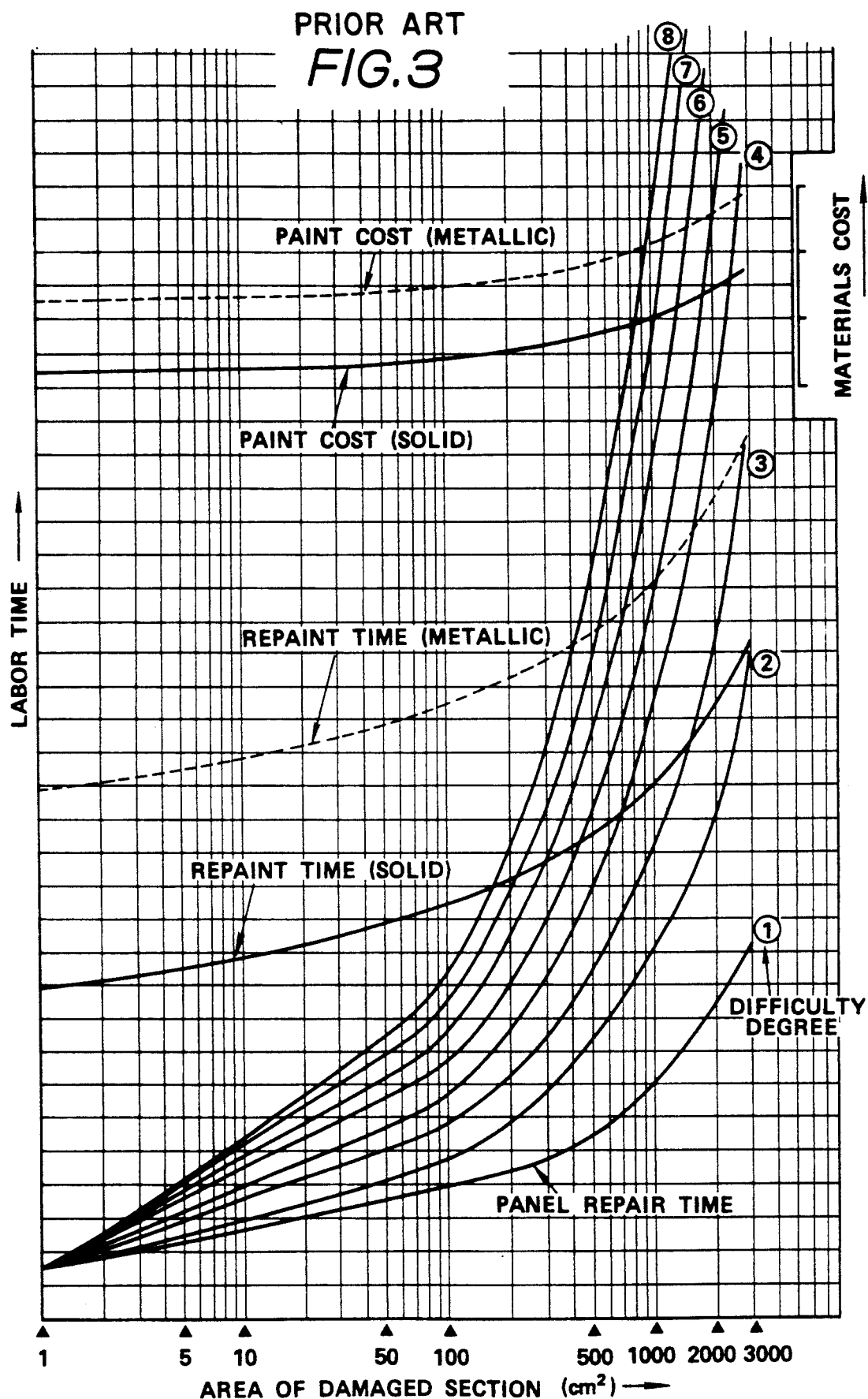

ESTIMATE GENERATING SYSTEM FOR AUTOMOTIVE PANEL REPAIRING

BACKGROUND OF THE INVENTION

1. Field of the Invention

The present invention relates generally to a system which enables the amount of damage, in terms of repair costs, to be quickly and easily generated particularly in environments which do not lend themselves to manually executed paper work.

2. Description of the Prior Art

Hithertofore, in the event that a damaged vehicle has been brought to a garage or panel beaters or, alternatively, a representative of such an establishment has gone to the site of a vehicle accident, it is often the case that an estimate of the damage in terms of repair costs must be provided in short order. For the purposes of providing such estimates it has been a common practice to refer to a predetermined schedule such as a wall chart of the nature shown in FIG. 3. However, as will be appreciated from this figure, the schedule is quite complex and arranged in terms of required work time (man hours) and damaged panel surface area. The effect of the extent of damage on the degree of panel beating required (viz., work to effect repair) are charted in terms of 8 levels of difficulty. Further, the time required to execute the repainting and the amount of paint (metallic or solid) involved and the cost of the same are respectively charted, as shown.

In order to use this type of schedule it is firstly necessary to inspect the damage and approximate the deformed area of the damaged section(s) and the degree of panel beating difficulty involved in the repair. Using these values, the vertical lines are followed from the base of the schedule, upwardly from the approximated area value until the appropriate line of difficulty is encountered. By reading across the schedule to the left, the amount of panel beating or repair time for the given approximations can be ascertained.

Following this, the amount of time required to repaint the section is calculated by determining the type of paint work involved (e.g. metallic or solid finish) and finding the intersection of the appropriate trace with the line of difficulty selected previously. By reading across to the left this value may ascertained.

The two time periods are summed and multiplied by the current labor rate in order to derive the labor cost.

Next, the cost of the paint is determined by using the traces provided at the upper section of the schedule and reading across to the right.

The two costs are then summed in order to derive the cost estimate for that section.

However, as will be appreciated, quite a few operations are required and it is difficult to execute rapidly without fear of error. Further, in the case that several sections of the vehicle are damaged (e.g. some badly deformed while others only slightly so) it is necessary to repeat the above procedure several times.

Further, due to the complexity of the schedule, in order to permit an operator to read off the values without excessive difficulty, the schedule cannot be printed on anything less than an A4 size sheet of paper. If the sheet on which the schedule is printed is large such as for wall chart use, the procedure of deriving accurate estimates during on the spot operations or moving in and around a vehicle in the confines of a cramped garage or paint shop wherein soiling and or damaging of such a chart is very easy, is increased undesirably, as the chart is invariably mounted on a wall located some distance from the vehicle under inspection and there is a need to frequently consult therewith.

SUMMARY OF THE INVENTION

It is an object of the present invention to provide a system whereby vehicle repair coat estimates can be quickly and easily generated and which system is highly portable so that it can be hand held and operated with ease while maneuvering in and around a damaged vehicle or the like.

In brief, the above object is achieved by a system which includes a pocket type computer and a control schedule which sequentially requests data relating to the number of damaged panels, the number of damaged sections of each of the panels, the damage degree or repair difficulty degree, the presence or absence of scratches, the length and depth of any scratches, the type of paint work (e.g. metallic or solid finish, the number of different colors or tones) and the current labor rate (cost per man hour); and calculates the amount of work, the amount of paint required and the cost of the paint based on the data input.

More specifically, a first aspect of the present invention takes the form of a system for generating a repair cost estimate for a vehicle having one or more damaged panels which features: a small lightweight computer capable of being hand held, the computer including: a keyboard; a screen on which messages and data input can be displayed; a microprocessor operatively connected with the keyboard and the screen, the microprocessor including circuity means for: accepting data input from the keyboard including the number of damaged panels, the number of damaged sections of each of the panels, the damage degree or repair difficulty degree, the presence or absence of scratches, the length and depth of any scratches, the type of paint work (e.g. metallic or solid finish, the number of different colors or tones) and the current labor rate (cost per man hour); and for calculating the amount of work, the amount of paint required and the cost of the paint based on the data input.

A further aspect of the present invention comes in the form of a system for generating a repair cost estimate for a vehicle having one or more damaged panels which features: a keyboard; a screen on which messages and data input can be displayed; a microprocessor operatiely connected with the keyboard and the screen, the microprocessor including circuitry means for: (a) displaying a message requesting the number of damaged individual panels to be inputted via the keyboard; (b) accepting keyboard input and recording the inputted number of panels; (c) displaying a message requesting the number of damaged sections of the first of the damaged panels and the presence or absence of scratches which are separate from the damaged sections; (d) accepting keyboard input recording the number of damaged sections and the presence of absence of scratches; (e) displaying a message requesting the surface area and degree to which damage has occured for each of the damaged sections; (f) accepting keyboard input and recording the surface area and damage degree data; (g) determining the amount of panel repair required for each damaged section; (h) repeating operations (e) to (g) in the event that more than one damaged section has been recorded in operation (d); (i) displaying a message requesting the input of data relating to the scratches in the event that the presence of the same is recorded; (j) accepting keyboard input and recording the number depth and length of the scratches; (k) determining the amount of repainting required to repair the scratches; (l) repeating operations (c) to (k) in the event that more than one panel is recorded in step (b); (m) displaying a message requesting the input of data relating to the repainting of the damaged portions; (n) accepting keyboard and recording data pertaining to the type of paint used and the number of colors; (o) determining on the basis of the paint related data recorded in operation (n) the amount of repainting and the amount of paint required to repair the damaged sections following the repair of the same; (p) displaying a message requesting that the current labor rate be inputted; (q) accepting keyboard input and recording the labor rate inputted in response to operation (p); and (u) determining the cost of repair by adding the cost of the paint to the sum of the panel repair, panel repainting and scratch repair and repainting operations multiplied by the current labor rate.

BRIEF DESCRIPTION OF THE DRAWINGS

FIG. 3 shows the prior art printed schedule discussed in the opening paragraphs of the instant disclosure.

DETAILED DESCRIPTION OF THE PREFERRED EMBODIMENTS

Figure 1:
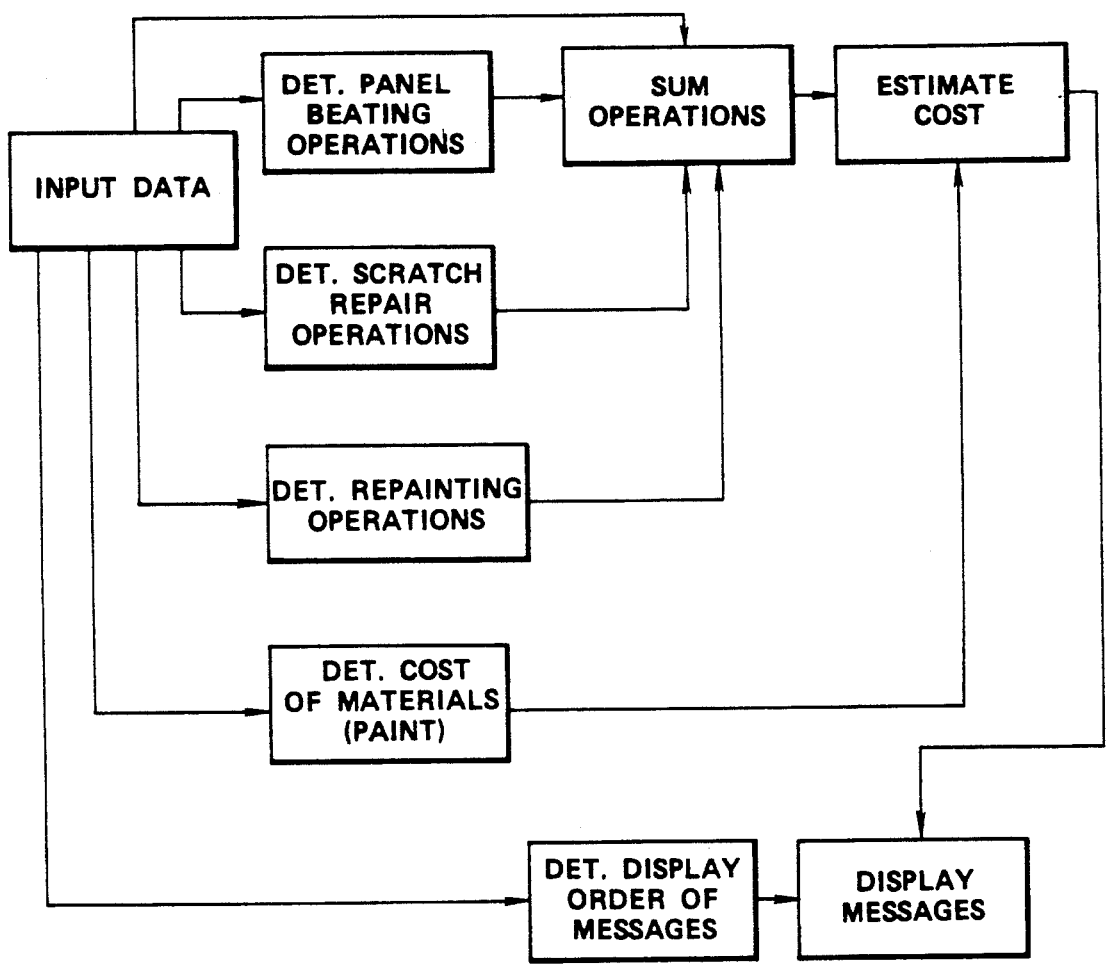
FIG. 1 is a block diagram schematically illustrating in functional block form the arrangement of the system according to the present invention.

FIG. 1 shows in functional block form the steps which are executed according to the instant invention in order to generate a repair cost estimate for a damaged automotive vehicle or the like. It will be understood that the arrangement of FIG. 1 represents in essence the combination of a suitable small scale computer, such as is often referred to as a "pocket computer" which can be held in one hand and operated with the other, with a program which is designed to perform the required data organization and calculations necessary to generate the required cost estimate.

The necessary data is inputted via a key pad or the like provided on the device and which also is conventially equipped with a screen or display, a CPU, RAM, ROM and at least one I/O board between the keyboard and the other elements.

The data in this instance includes the number of damaged panels, the number of damaged sections of each of the panels, the damage degree or repair difficulty degree, the presence or absence of scratches, the length and depth of any scratches, the type of paint work (e.g. metallic or solid finish, the number of different colors or tones) and the current labor rate (cost per man hour).

This data is inputted in a predetermined sequence and is appropriately stored in memory (RAM) in preparation for the various calculation steps which are executed according to the present invention.

Figure 2A:
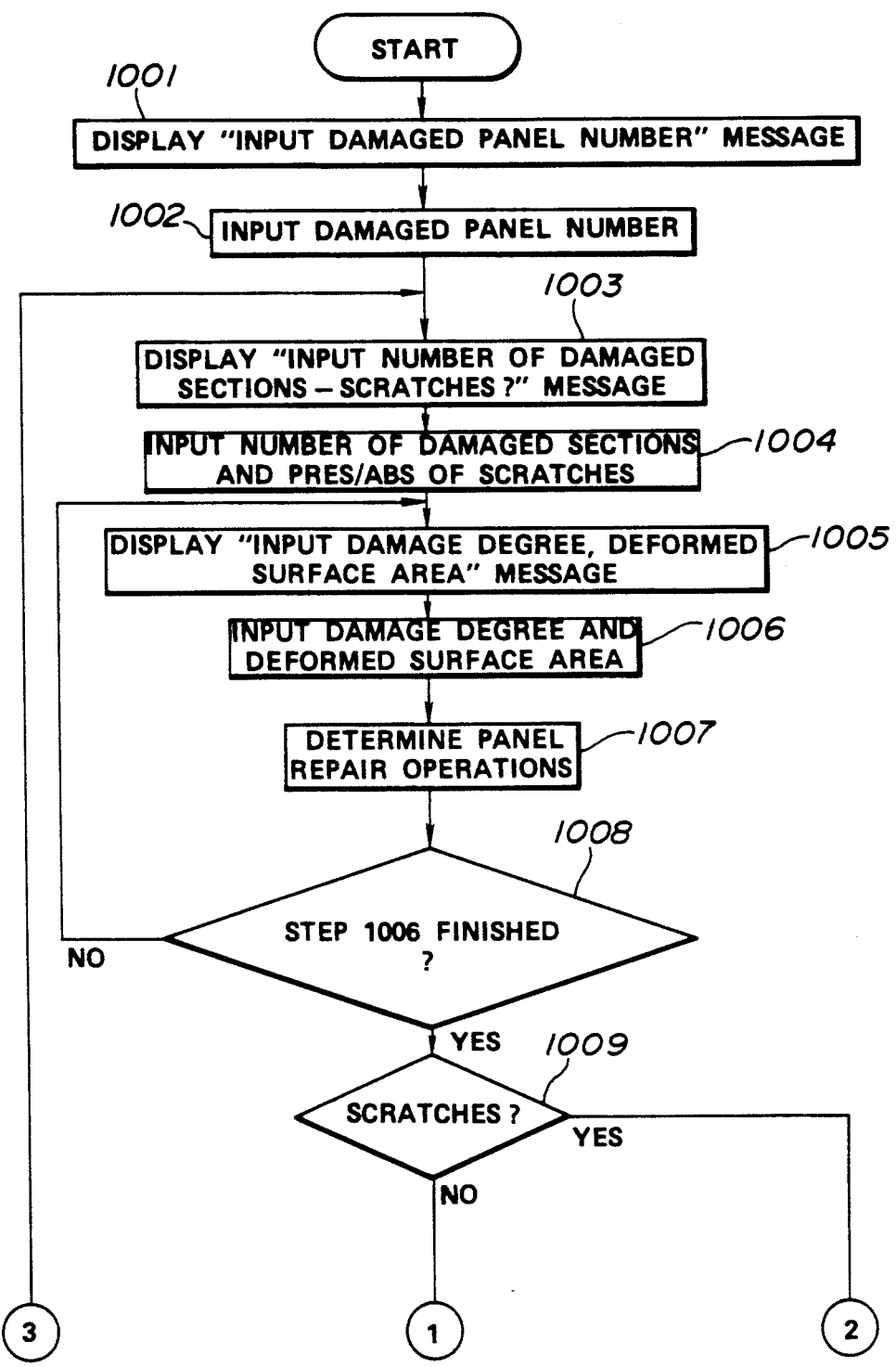
FIGS. 2A and 2B show a flow chart depicting the steps which characterize the operations performed by a program according to the invention which is run in a small portable hand-held or so called "pocket" type computer.
Figure 2B:
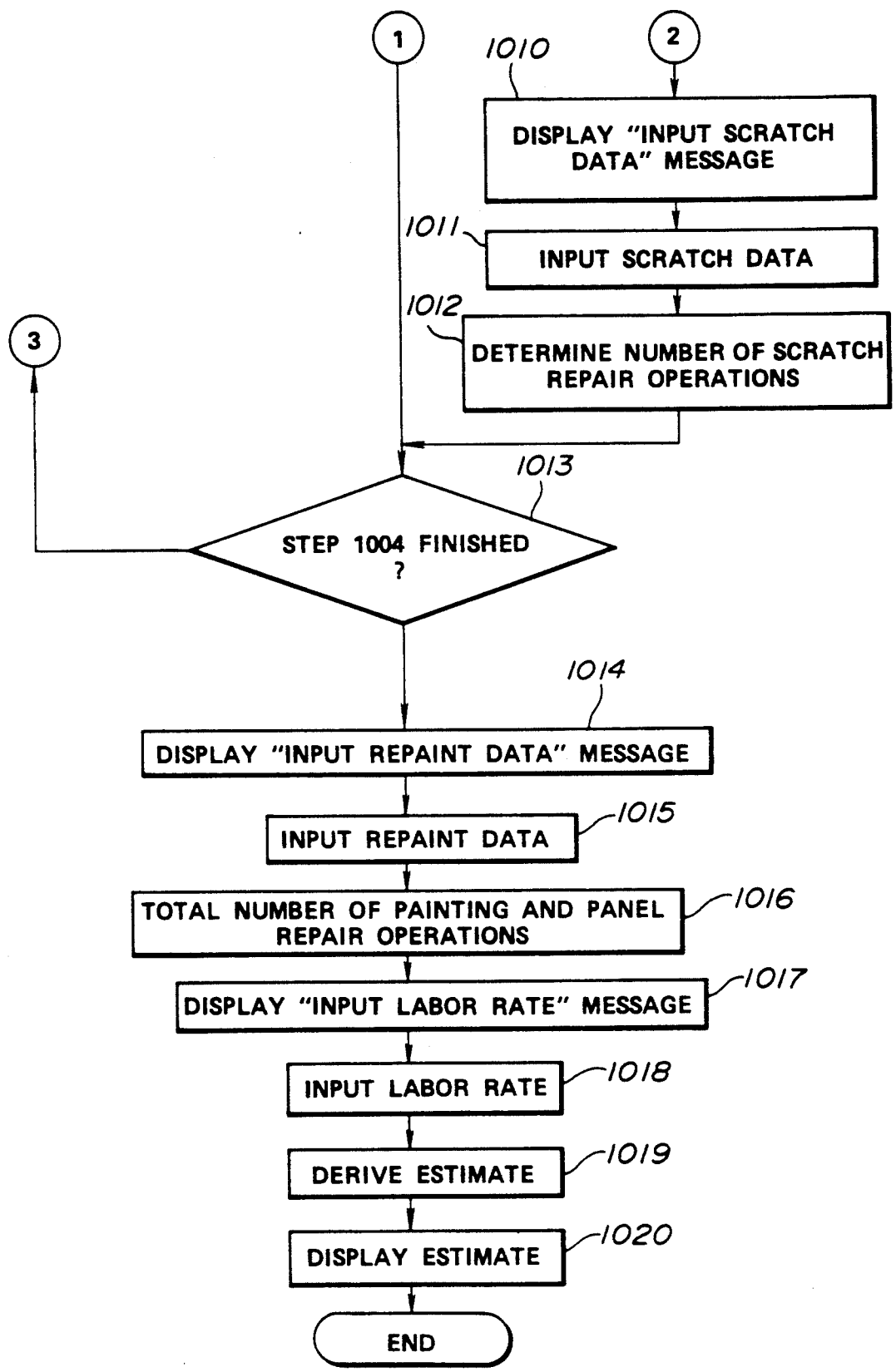

The characterizing steps of a program according to an embodiment of the instant invention are shown in FIGS. 2A and 2B.

The first step 1001 of this program is such as to recall a first display message from ROM and have the same displayed on the liquid crystal (or the like) screen of the computer in which the instant program is being run. In this instance the message is the "input damaged panel number". In response to this the operator is required to determine by a visual inspection of the damage the number of panels which are damaged. By way of example, these panels may take the form of the trunk lid, the front door, rear door, engine hood panel etc. After receiving an input of a number which is temporarily stored in RAM the program proceeds to step 1003 wherein a command to call a second message "input number of damaged sections-scratches" from ROM and display this on the screen of the device, is issued. In response to this message the operator types in the appropriate number and a "+" (yes) or "−" (no) (for example) indicating the presence of scratches which are separate from the damaged sections.

Subsequently, as step 1005 the program calls a third message from ROM and induces the same to appear on the screen of the computer. In this instance the message reads "input damage degree, deformed surface area" In this response it is required that the operator estimate on a scale of 1 to 8, for example, the degree of difficulty that will be encountered in repairing each of the damaged sections. As it is necessary to input this data for each of the damaged sections, the instant program is such that after step 1007 wherein a cost calculation for one damaged section is completed, the program determines in step 1008 if all of the inputted number of damaged sections have been processed for damage degree and area. For example, if at step 1003, it is indicated that the trunk lid has two damaged sections the program will recycle once from step 1008 back to step 1005 to ensure that data for both of the sites in question are appropriately logged.

According to the instant embodiment, each panel repair operation calculation is carried out using the following equations:

$$H = KA \tag{1}$$

wherein:
A denotes the area of a damaged portion; and
K is a constant having a value less than 1; and $$Bh = ([a1 \times Z/H + a2] + Z) \times H \times Y + J \tag{2}$$

wherein:
a1 and a2 are constants;
Y denotes an operation factor margin which can vary from 1 to 2;
J is a factor which allows for the time required for the necessary preparation; and
Z denotes the degree of repair difficulty (viz., damage degree).

It should be noted that in the event that the damaged area is in excess of a predetermined value, for example 100 cm2, then the values of the constants involved are changed. Alternatively, it is within the scope of the present invention to utilize a second different equation which more accurately reflects the instant situation.

At step 1009 the presence or absence of scratch data is examined. In the event that there are no scratches outside of the damaged zones or sections of the panel in question, the program flows on to step 1013. In this step an enquiry is conducted to determine if all of the panels inputted at step 1002, have had the respective number of damaged sections, damage degree etc., recorded or not. In the event that there are three separate panels which have been damaged the program recycles twice from step 1013 back to step 1003.

In the case that the outcome of the enquiry conducted at step 1009 indicates that there are in fact scratches which will require repair, then the program flows to steps 1010–1012. At this section of the program a fourth message requesting scratch data such as the number, depth and length, is displayed. At step 1012 a calculation is performed to determine a value indicative of the number of operations which must be performed in order to sand and repaint the scratched portions is carried out. This calculation is executed using the following equation:

$$Sh = [a3/(L \times F + a4) + 1] \times L \times F + J \qquad (3)$$

wherein:
Y and J are same as defined above;
a3 and a4 are constants; and
L and F denotes the length and the depth of the scratches.

At step 1014 a fifth message requesting that repainting data be inputted, is displayed. In response to this it is required that the type of paint—viz., metallic or solid finish, and the number of tones and/or colors be typed in. As step 1016 the total number of painting and panel repair operations are calculated. This calculation however, firstly requires that the repainting operations be calculated. To this end, in the event that the data inputted at step 1015 indicates that the paint on the damaged panel is a solid finish type then the following equation is used:

$$Ch = An \times (\sqrt{H1} + \ldots \sqrt{Hn} + J1) \times P \times Y \times C1 + Cq \qquad (4)$$

On the other hand if the paint is of the metallic type then the following equation is used:

$$Ch = \qquad (5)$$
$$An \times (\sqrt{H1} + \ldots \sqrt{Hn} + J2) \times P \times Y \times M + C2 + Cq$$

In these equations:
An denotes an area coefficient the value of which can vary between 1 and 3 (for example) and which decreases with the increase in area;
H1 ... Hn denote areas of each of the damaged sections;
J1, J2 denote preparation times—for example 20–30 minutes;
P denotes a panel coefficient which can vary from 1–2 in magnitude;
M denotes a metallic coefficient which can vary from 1–1.5;
C1, C2 denote color matching factors which can vary from 30 to 50 minutes (note that metallic preparation and matching take longer than in the case of solid finishes).
Cq denotes a color adjustment factor which is set to 0 for one color and 30–50 minutes for two colors. Note that this factor can vary for two color situations wherein both colours are solid, both are metallic and one is metallic while the other is solid. The latter two types of combinations require more time that the solid-solid combination. Accordingly, it is within the scope of the present invention to provide sub-routines which will adjust the value of Cq in accordance with the various paint related data available.

Next, it is necessary to calculate the cost of the paint. This is done using the following equation:

$$Cp = a5(\sqrt{H1} + \ldots \sqrt{Hn}) + a6 \qquad (6)$$

wherein: a5 and a6 are constants.

It should be noted that the cost of metallic paint is usually higher than that of solid types. It is possible to sum the values of Bh, Sh and Ch at this stage and set the result in RAM along with the value of Cp ready for the next stage.

At step 1017 a command to issue a sixth message is issued. In response to this the current labor rate is inputted and at step 1019 the following equation used to generate the required estimate:

$$Gt = (Bh + Sh + Ch) \times Lr + Cp \qquad (7)$$

At step 1020 a command to display the estimate on the screen of the pocket computer is issued and the program ends.

It will of course be appreciated that, if so desired, this estimate value can be assigned a suitable code or identifying name and stored in memory for recall and/or upload into a host computer at a later date. It is also possible to arrange for the result and/or all of the inputs to be sent to a printer in the event that such a printer is provided on and/or can be connected via cable to the computer in question.

It should be noted that in addition to the Cq value it is additionally within the scope of the present invention to provide sub-routines which will be select the appropriate values of values such as Y, J1, J2, P and M in view of the data available.

What is claimed is:

1. A system for generating a repair cost estimate for a vehicle having one or more damaged panels comprising:
    data input means having manually actuatable input keys for providing data input signals in response to the actuation of said input keys;
    display means which is responsive to display command signals on which messages and data input can be displayed;
    a microprocessor operatively connected with said keyboard and said screen, said microprocessor including circuitry means for:
        (a) producing display control signals which cause said display means to display a message requesting a number of damaged individual panels to be inputted via the keyboard;
        (b) recording the data input signals from said data input means indicative of an inputted number of panels;
        (c) producing display control signals which cause said display means to display a message requesting a number of damaged sections of a first of the damaged panels and a presence or absence of scratches which are separate from the damaged sections;
        (d) recording the data input signals from said data input means indicating the number of damaged sections and the presence or absence of scratches;

(e) producing display control signals which cause said display means to display a message requesting a surface area and degree to which damage has occurred for each of the damaged sections;

(f) recording the data input signals from said data input means indicative of surface area and damage degree data;

(g) producing signals indicating an amount of panel repair required for each damaged section;

(h) repeating signal generating operations (e) to (g) in the event that more than one damaged section has been recorded in operation (d);

(i) producing display control signals which cause said display means to display a message requesting input of data relating to the scratches in the event that the presence of scratches is recorded;

(j) recording the data input signals from said data input means indicative of number, depth and length of the scratches;

(k) producing signals indicative of an amount of repainting required to repair the scratches;

(l) repeating signal generating operations (c) to (k) in the event that more than one panel is recorded in operation (b);

(m) producing display control signals which cause said display means to display a message requesting input of data relating to repainting of damaged portions;

(n) recording the data input signals from said data input means data pertaining to type of paint used and number of colors required;

(o) producing signals based on paint related data recorded in operation (n), the amount of repainting required, and the amount of paint required to repair the damaged sections following repair of same;

(p) producing display control signals which cause said display means to display a message requesting that a current labor rate be inputted;

(q) recording the data input signals from said data input means indicative of the current labor rate;

(u) producing signals indicative of a cost of repair by adding cost of the paint to a sum of the panel repair, panel repainting and scratch repair and repainting operations, multiplied by the current labor rate; and (v) producing display control signals based on the cost indicative signals and supplying these display control signals to the display means.

2. A system as claimed in claim 1 wherein the signals indicative of the amount of repair for each panel determined in operation (g) are generated using the equations:

$$H = KA$$

wherein:
H denotes the damaged surface area;
A denotes the area of a damaged portion; and
K is a constant having a value less than 1; and $$Bh = ([a2 \times Z/H + a2] + Z) \times (H \times Y) + J$$

wherein:
Bh denotes the panel repair costs;
a1 and a2 are constants;
Y denotes an operation factor margin which can vary from 1 to 2;
J is a factor which allows for time required for necessary preparation; and
Z denotes degree of difficulty of executing the repair.

3. A system as claimed in claim 2 wherein the signals indicative of the amount of repainting required to repair the scratches determined in operation (k) are generated using the following equation:

$$Sh = [a3/(L \times F + a4) + 1] \times (L \times F) + J$$

wherein:
Sh denotes the scratch repair costs;
J is a factor which allows for time required for necessary preparation;
a3 and a4 are constants; and
L and F denote the length and the depth of the scratches.

4. A system as claimed in claim 3 wherein the signals indicative of the amount of repainting required by the damaged portions determined in operation (o) are generated for solid finish paint work using the following equation:

$$Ch = An \times (\sqrt{H1} + \ldots \sqrt{Hn} + J1) \times (P \times Y \times C1) + Cq$$

and by the following equation if the paint is of a metallic type:

$$Ch = \qquad (5)$$
$$An \times (\sqrt{H1} + \ldots \sqrt{Hn} + J2) \times (P \times Y \times M) + C2 + Cq$$

wherein:
Ch denotes the repainting costs;
An denotes an area coefficient which can vary between 1 and 3 and which decreases with an increase in area;
H1 ... Hn denote areas of each of the damaged sections;
J1, J2 denote preparation times;
P denotes a panel coefficient which can vary from 1-2 in magnitude;
M denotes a metallic coefficient which can vary from 1-1.5;
C1, C2 denote color matching factors which can vary from 30 to 50 minutes; and
Cq denotes a color adjustment factor which is set to 0 for the one color and 30-50 minutes for two colors.

5. A system as claimed in claim 4 wherein the signals indicative of the cost of the paint derived in operation (o) are calculated using the following equation;

$$Cp = a5(\sqrt{H1} + \ldots \sqrt{Hn}) + a6$$

wherein:
Cp denotes the cost of paint; and
a5 and a6 are constants.

6. A system as claimed in claim 5 wherein the signals indicative of the cost of repair determined in operation (u) are calculated using the following equation:

$$Gt = (Bh + Sh + Ch) \times (Lr) + Cp$$

wherein:
Gt denotes the cost of repair.

* * * * *